(12) United States Patent
Chiang

(10) Patent No.: US 6,336,156 B1
(45) Date of Patent: Jan. 1, 2002

(54) INCREASED SPEED INITIALIZATION USING DYNAMIC SLOT ALLOCATION

(75) Inventor: John Chiang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/296,551

(22) Filed: Apr. 22, 1999

(51) Int. Cl.$^7$ .............. G06F 13/372; G06F 13/14
(52) U.S. Cl. .................. 710/45; 710/8; 710/10; 710/36
(58) Field of Search ................ 710/45, 36, 10, 710/8

(56) References Cited

U.S. PATENT DOCUMENTS 5,062,035 * 10/1991 Tanimoto et al. ............... 364/200
5,515,376    5/1996 Murthy et al. ................. 370/85.13
6,243,391 *  6/2001 Holmquist ..................... 370/458
6,249,521 *  6/2001 Kerstein ....................... 370/389

* cited by examiner

Primary Examiner—Thomas Lee
Assistant Examiner—Rehana Perveen

(57) ABSTRACT

A method and apparatus are disclosed for decreasing the amount of time required to initialize a multiport switch. An address table stores addresses of source and destination stations that transmit and receive data frames to and from the multiport switch. Initialization logic is used for constructing and initializing the address table upon startup of the multiport switch. During normal operation of the multiport switch, a scheduler functions to allocate address table access bandwidth to various components of the multiport switch. Upon startup of the multiport switch, the scheduler increases the amount of bandwidth allocated to the initialization logic. The amount of bandwidth allocated to the initialization logic is decreased once the multiport switch is initialized.

16 Claims, 13 Drawing Sheets

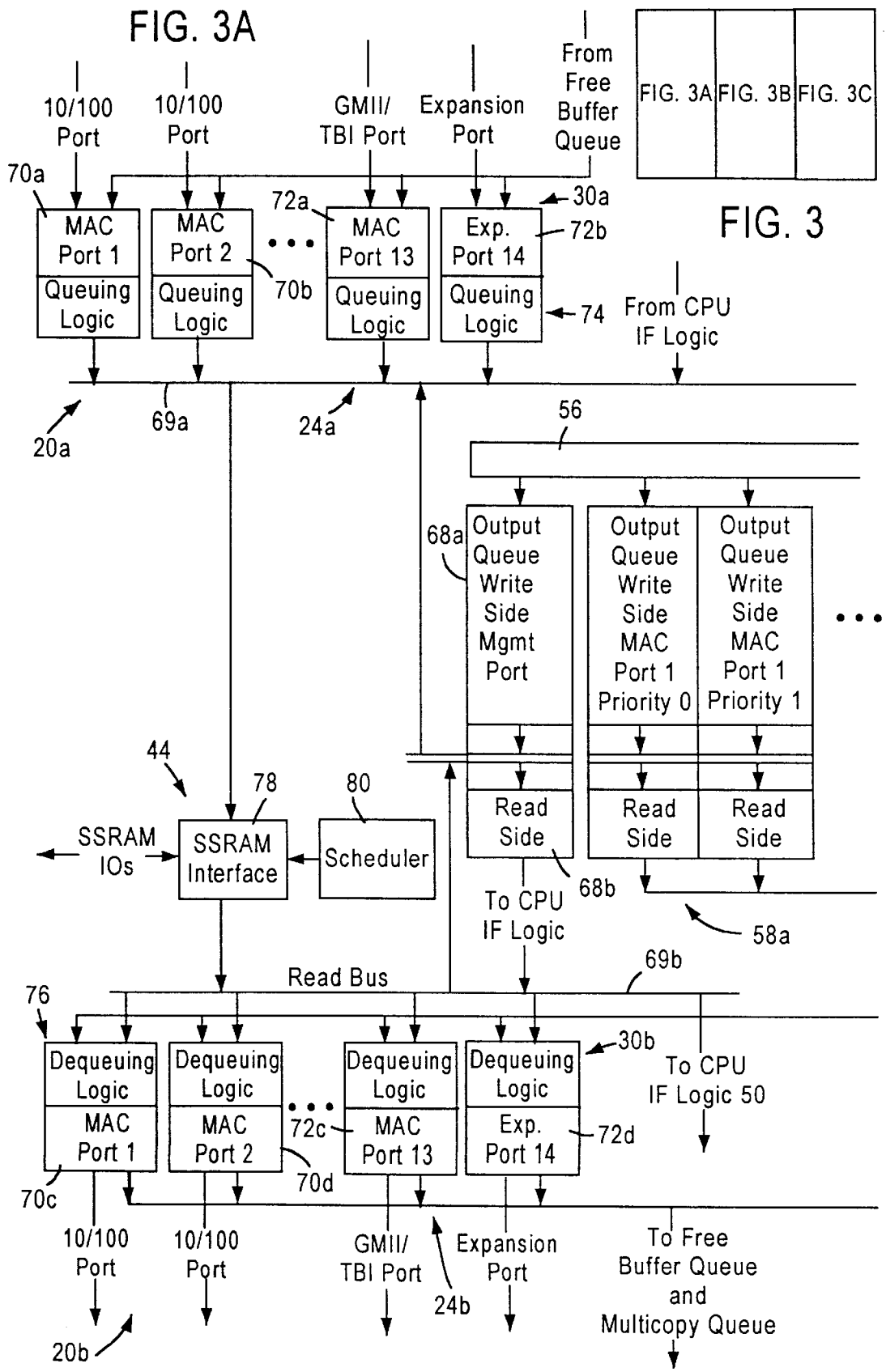

INCREASED SPEED INITIALIZATION USING DYNAMIC SLOT ALLOCATION

BACKGROUND OF THE INVENTION

1. Field of the Invention

The present invention relates to communication systems, and more particularly, to a method and apparatus for decreasing the amount of time required to initialize a network switch in a computer networking system.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards frame data to individual and/or multiple end stations. The switch makes forwarding decisions upon receipt of frame data based on information contained in a header of the frame data. For example, if a received frame data is to be transmitted to a number of end stations, the switch must make the forwarding decision to forward the frame data to the ports of the correct end stations. Prior to engaging in routine network activity, most network switches must be properly initialized and configured in order to enable transmission of frame data between the various stations.

Switch initialization and configuration can be accomplished in several ways depending upon the specific system implementation. For example, in certain systems, a Central Processing Unit or (CPU) may be responsible for initializing and configuring the system. Alternatively, the switch may include appropriate hardware for self-initialization.

Significant downtime is typically encountered while waiting for the various subsystems of the switch to be initialized and properly configured. One factor that contributes to this downtime is the manner in which the various sub-systems are scheduled to transmit and receive data. For example, when the switch first becomes operational, there are very few sub-systems that must transmit or receive data. However, most switches simply allocate predetermined time intervals during this period for each sub-system to transmit or receive data. This is particularly wasteful when the majority of sub-systems are idle. Meanwhile, the sub-systems that are active in initializing and configuring the switch are restricted to performing transmit and receive operations only during their prescribed time intervals. Consequently, downtime of the switch is increased because the sub-systems that must perform significant data transfers are not provided with increased time intervals, while the time intervals allocated to the idle sub-systems are wasted. For example, in a typical switch, the sub-system responsible for performing a significant part of initializing the switch may be only allocated $\frac{1}{5}$ of the time intervals. However, when the switch is first turned on, $\frac{3}{5}$ of the time intervals may be allocated to sub-systems that are idle. Hence, the amount of time required to initialize the switch is significantly increased.

Accordingly, a principal problem associated with network switches is the delay that results when the switch is initialized and configured at startup. Another problem associated with network switches is the amount of bandwidth that is wasted on idle sub-systems during the switch initialization process.

DISCLOSURE OF THE INVENTION

There exists a need for an arrangement capable of quickly and efficiently initializing and configuring a network switch with minimal delay. There is also a need for a low cost arrangement that optimizes the allocation of bandwidth while initializing and configuring a network switch.

These and other needs are addressed by the present invention wherein time slots allocated for accessing an address table by various components of a network switch are reallocated to the component responsible for initializing the address table in order to increase initialization speed of the network switch.

In accordance with one aspect of the present invention, a method of initializing an internal rules checker that makes forwarding decisions for a multiport switch comprises the steps: receiving a first signal that requires initialization of the internal rules checker; increasing, from a nominal value, the number of time slots allocated to an initialization logic of the internal rules checker by a scheduler coupled to the internal rules checker, each time slot corresponding to a prescribed time interval within which data may be transferred to or from the internal rules checker; constructing, by the initialization logic during the increased number of time slots, an address table that stores addresses of source and destination stations that transmit and receive data frames to and from the multiport switch; and decreasing the number of time slots allocated to the initialization logic back to the nominal value after the address table has been constructed. The present method reduces the amount of time required to initialize the multiport switch by temporarily restricting access to the address table by non-essential components during initialization of the multiport switch. The time slots previously allocated to those components are then reallocated to the single component responsible for initializing the address table. Hence, the amount of time required to initialize the multiport switch can be greatly reduced.

In accordance with another aspect of the invention, an apparatus for initializing an internal rules checker that makes forwarding decisions for a multiport switch. The apparatus includes an address table, initialization logic, and a scheduler. The address table stores addresses of source and destination stations that transmit and receive data frames to and from the multiport switch. The initialization logic is used for constructing and initializing the address table upon startup of the multiport switch. The scheduler allocates address table bandwidth in the form of time slots to various components of the multiport switch, including the initialization logic. Each time slot corresponding to a prescribed time interval within which data may be transferred to or from the internal rules checker. In addition, the scheduler is configured to increase the number of time slots allocated to the initialization logic upon startup of the multiport switch, and decreasing the number of time slots allocated to the initialization logic once the multiport switch is initialized. The present arrangement advantageously reduces the amount of time required to initialize the multiport switch by temporarily restricting access to the address table by non-essential components during initialization of the multiport switch. Hence, the amount of downtime experience during initialization can be greatly reduced.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designation represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
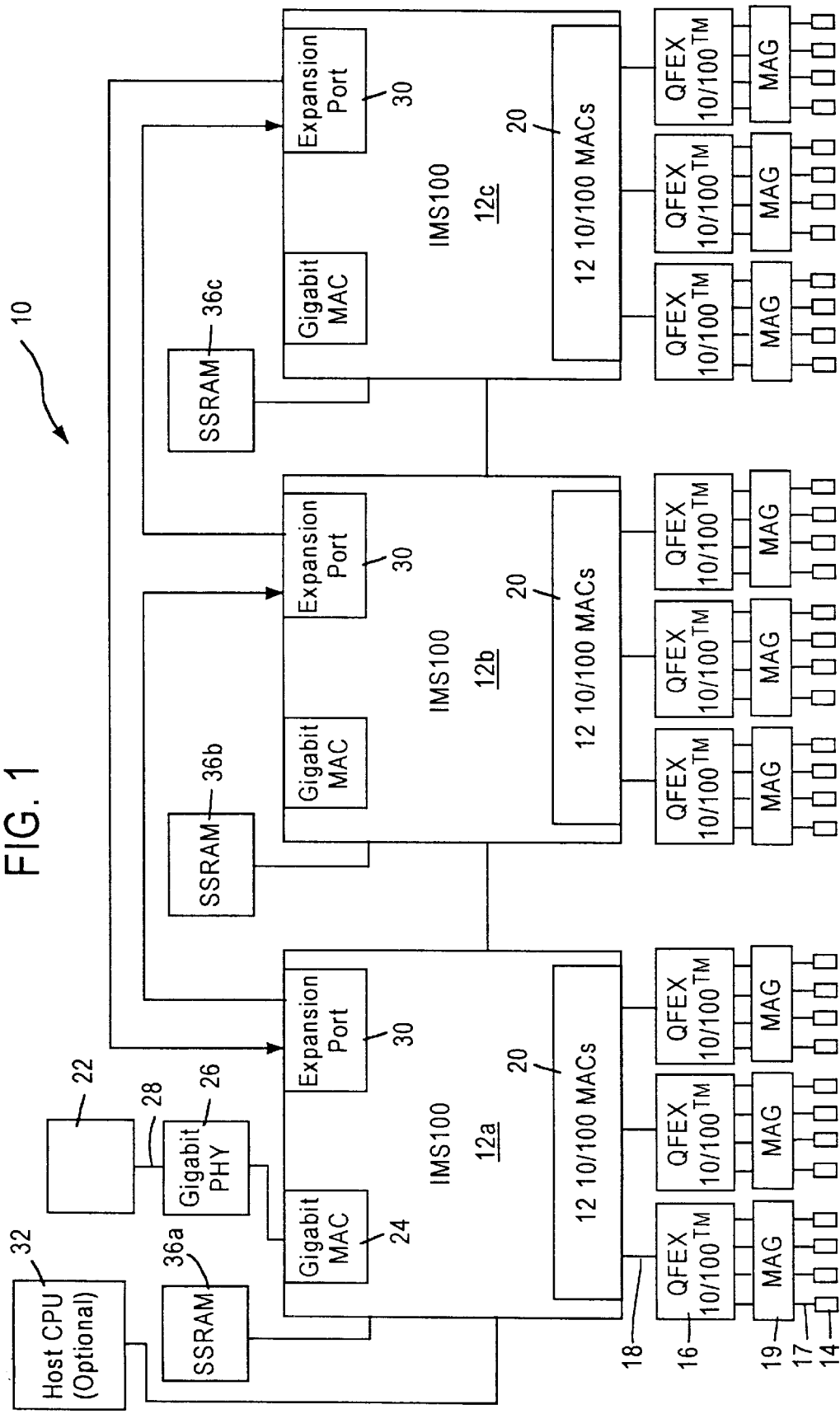
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MIE) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MIN 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
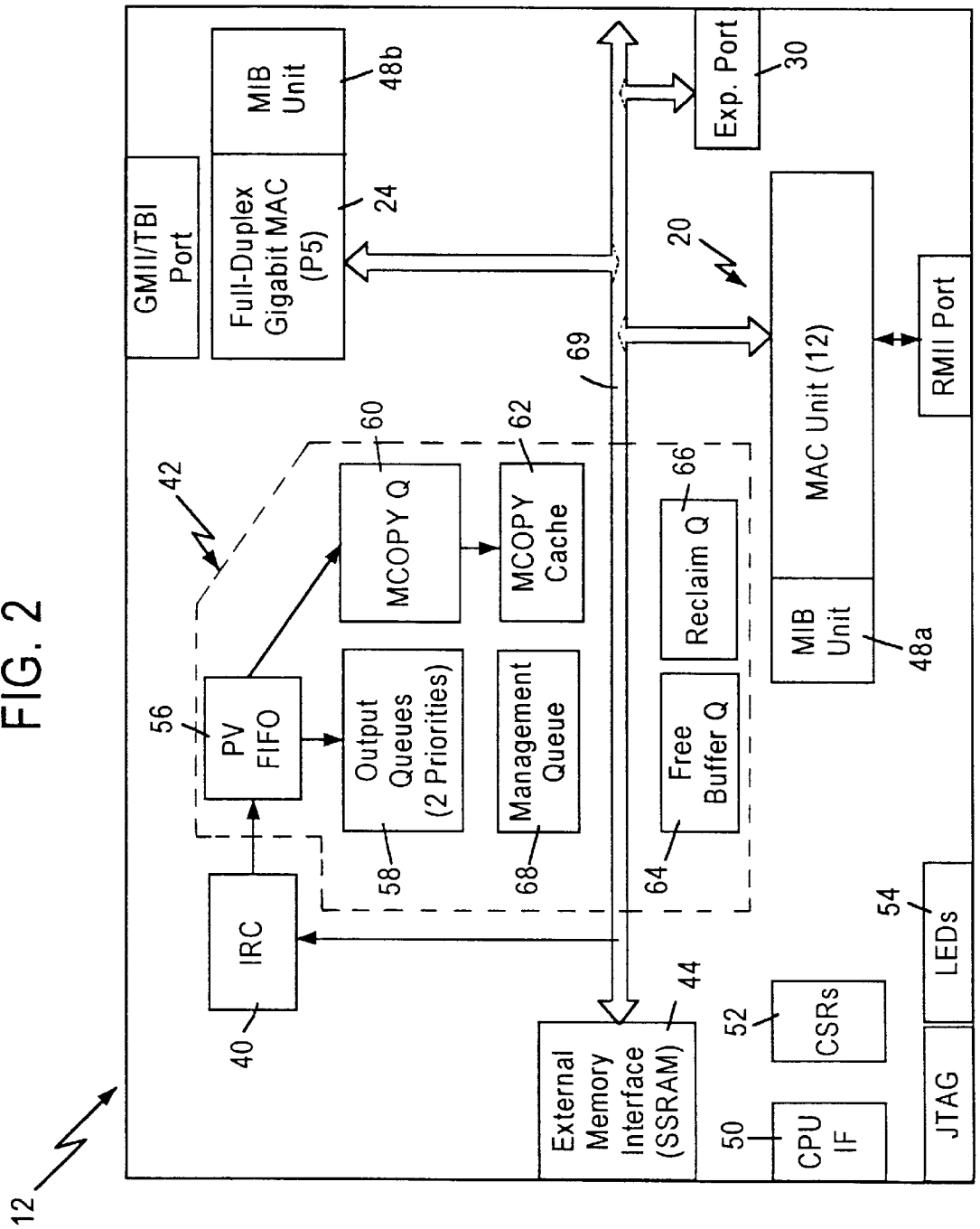
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit mode 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data, memory structures, and MB counter information. The external memory 36 is preferably either a Joint Electron Device Engineering Council (JEDEC) pipelined burst or Zero Bus Turnaround™ (ZBT)-SSRAM having a 64-bit wide data path and a 16-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching sub-system 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the flame pointer value and the associated header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data frame may include a VLAN (virtual LAN) tagged frame according to IEEE 802.1d protocol that specifies another network (e.g., via a gateway such as the gigabit mode 22) or a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch sub-system 42 in the form of a forwarding descriptor. The forwarding descriptor includes a priority class identifying whether the frame is high priority or low priority, a port vector identifying each MAC port that should receive the data frame, Rx port number, an untagged set field, VLAN information, op code, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the port vector is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
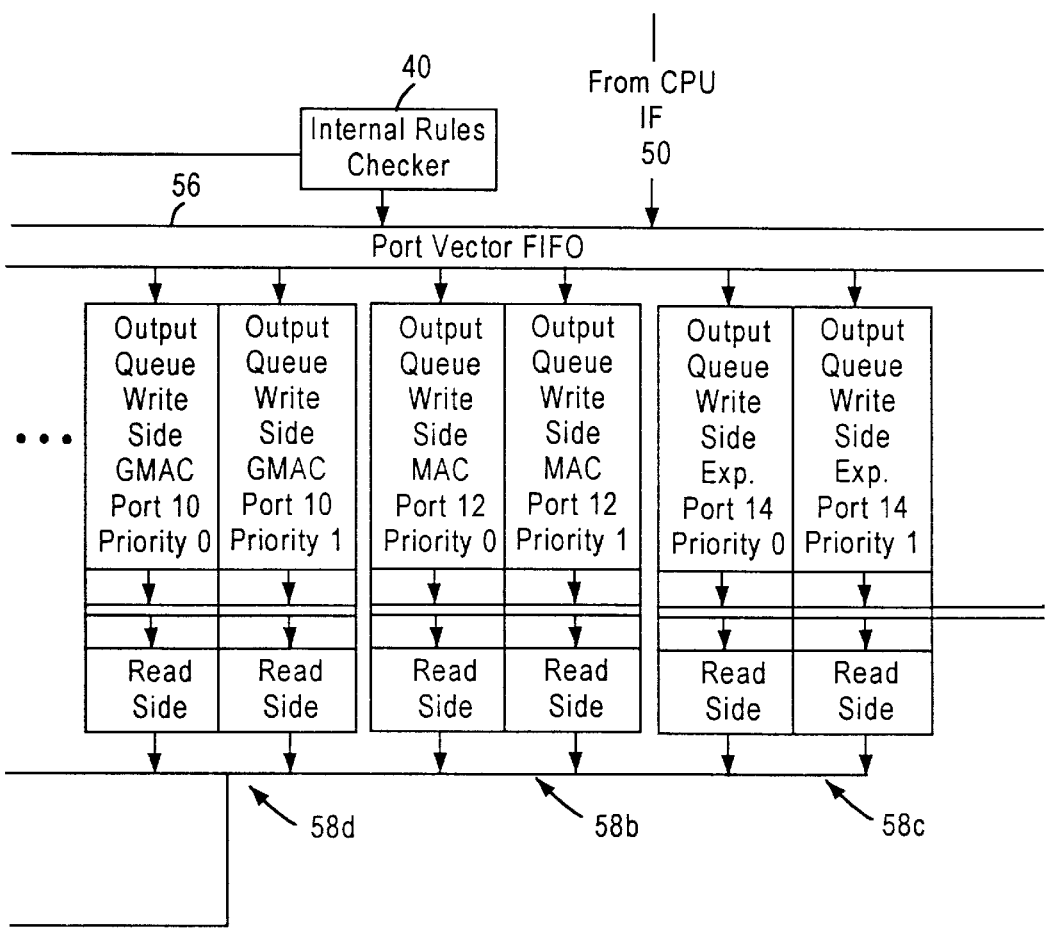
FIG. 3 is a block diagram illustrating in detail the switching sub-system of FIG. 2.
Figure 3C:
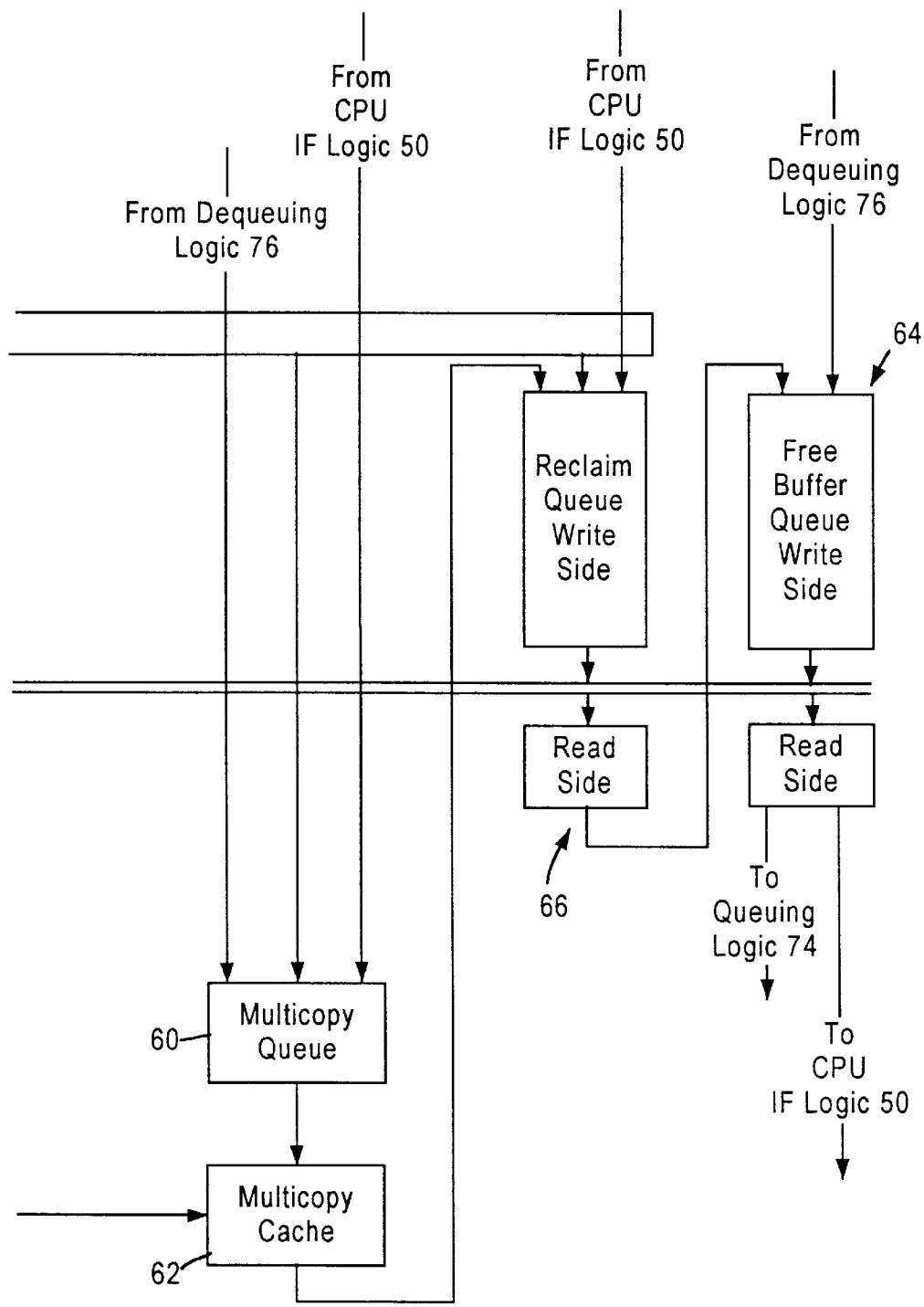

FIG. 3 depicts the switch sub-system 42 of FIG. 2 in more detail according to an exemplary embodiment of the present invention. Other elements of the multiport switch 12 of FIG. 2 are reproduced in FIG. 3 to illustrate the connections of the switch sub-system 42 to these other elements.

As shown in FIG. 3, the MAC module 20 includes a receive portion 20a and a transmit portion 20b. The receive portion 20a and the transmit portion 20b each include four (4) quad-MAC enhanced (QMACE) modules (only two of each shown and referenced by numerals 70a, 70b, 70c, and 70d) configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; etc. The QMACE modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data flame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a data frame in an internal FIFO upon reception from the corresponding switch port. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). The frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the output queues 58 or the management queue 68, should receive the associated frame pointer. The port vector FIFO 56 places the frame pointer into the top of the appropriate queue 58 and/or 68. This queues the transmission of the frame. Each output queue 58 is processed separately by the host CPU 32 via the CPU interface 50.

As shown in FIG. 3, each of the transmit MAC units 70c, 70d, 72d, and 72c has an associated output queue 58a, 58b, 58c, and 58d, respectively. Although not shown in FIG. 3, in preferred embodiments each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of the IRC will be discussed, followed by the details for dynamically allocating time slots during initialization.

IRC and Frame Forwarding

Figure 4:
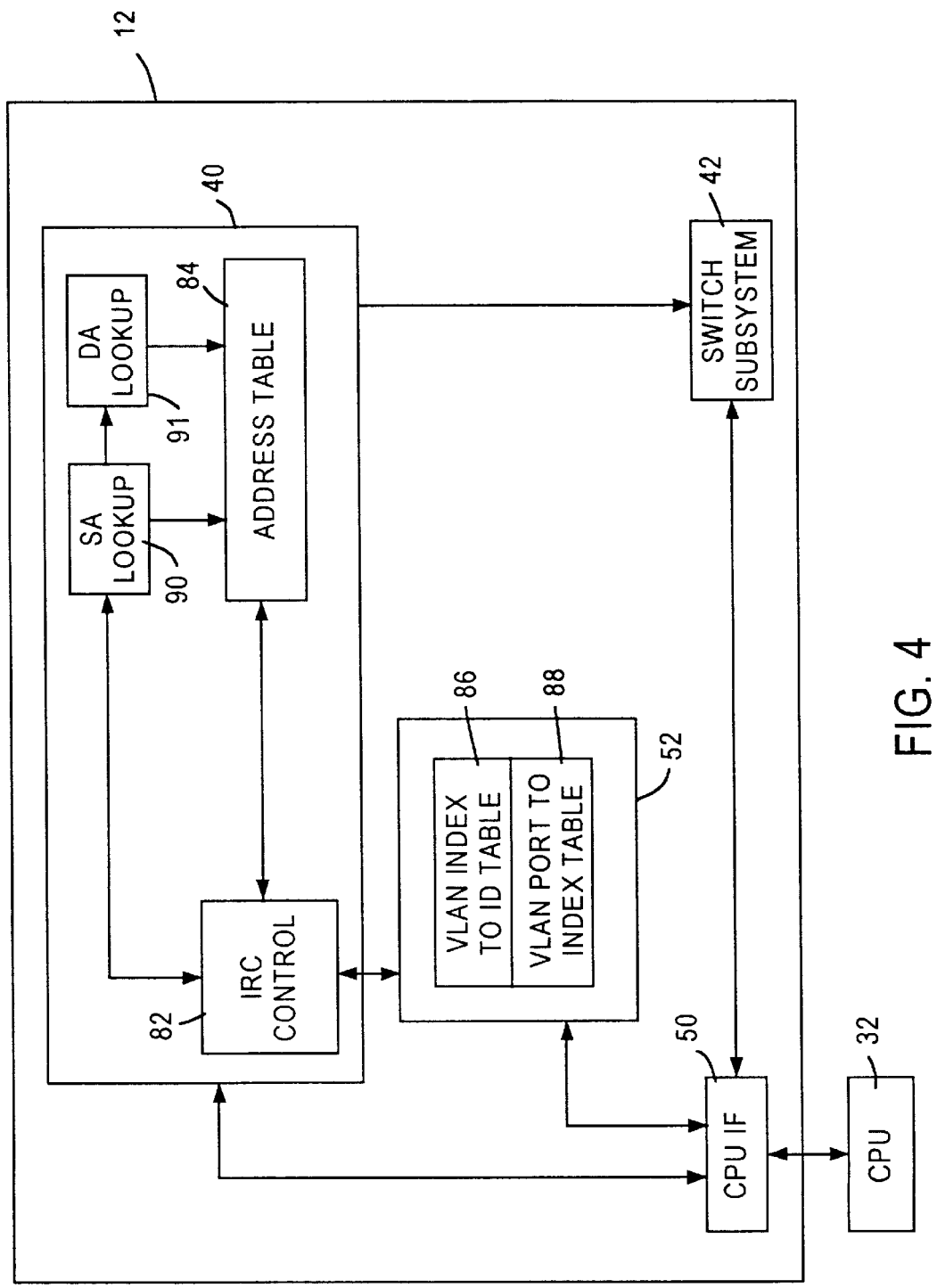
FIG. 4 is a block diagram of a system including the internal rules checker of FIG. 2 in accordance with an embodiment of the present invention.

FIG. 4 illustrates an exemplary embodiment of the IRC 40 which includes an IRC controller 82, an address table 84, a source address lookup logic 90, and a destination address lookup logic 91. In the exemplary embodiment, the address table 84 is located within the IRC 40. In alternative embodiments, the address table 84 is located outside the IRC 40 within another part of the switch 12 or external to the switch 12.

In the exemplary embodiment, the address table 84 supports 4096 user addresses and sixty-four (64) unique virtual local area networks (VLANs), although the number of addresses and VLANs supported may be increased by expanding the table size. The VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network. The IRC 40 passes the header of each received data frame through the source address lookup logic 90 in order to obtain matching entries within the address table 84.

Figure 5:
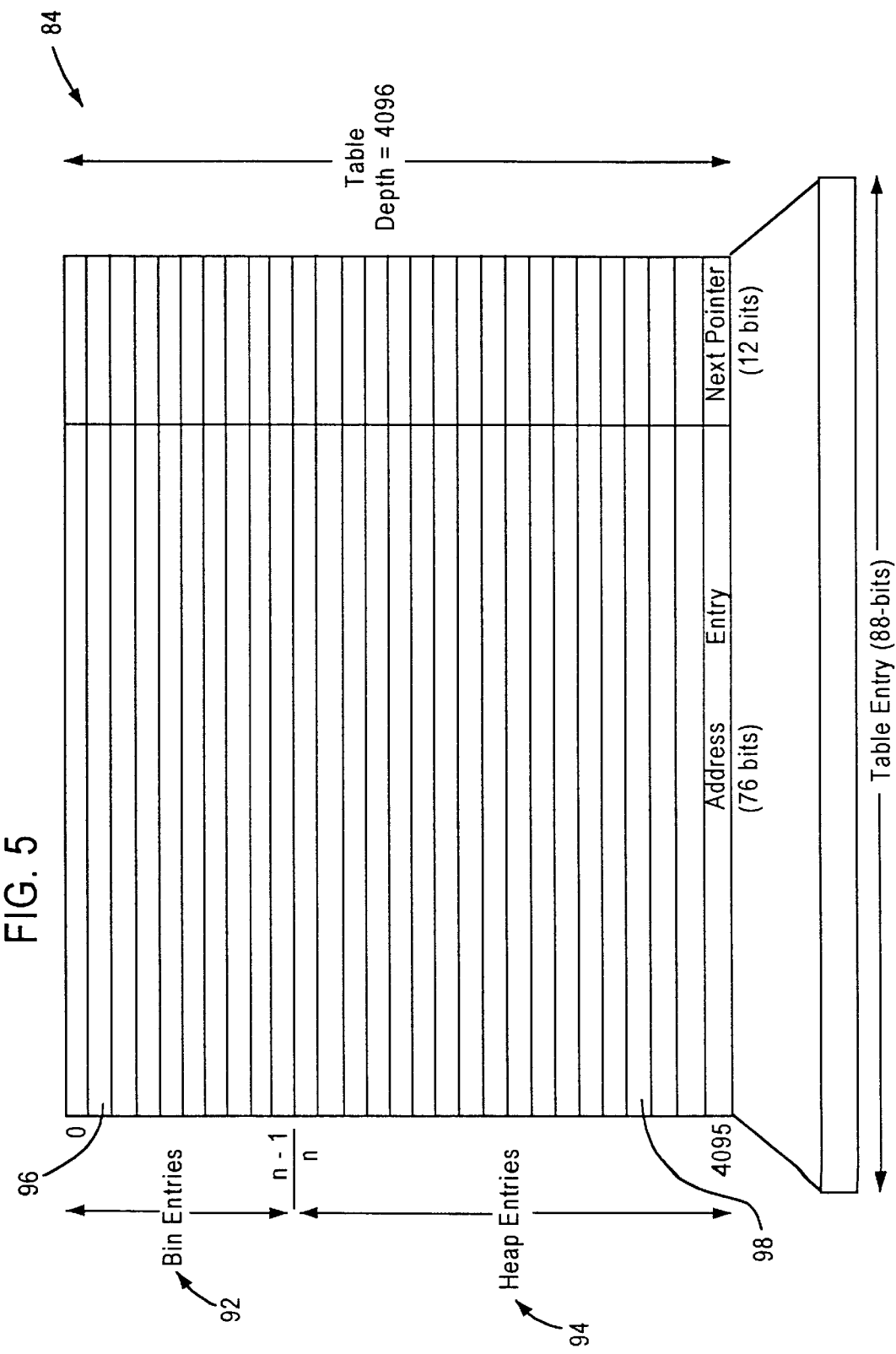
FIG. 5 illustrates the composition of the IRC address table of FIG. 4.

FIG. 5 illustrates the organization of the IRC address table 84. The IRC address table 84 contains an array of 4096 entries. The first portion of "n" entries 92 is referred to as "bin entries" 96 and have addresses from "0" to "n−1". The remaining portion of entries 94 are referred to as "heap entries" 98 and have addresses from "n" to "4095". Each of the table entries includes a 76-bit address entry field and a 12-bit "next pointer" field.

Figure 6:
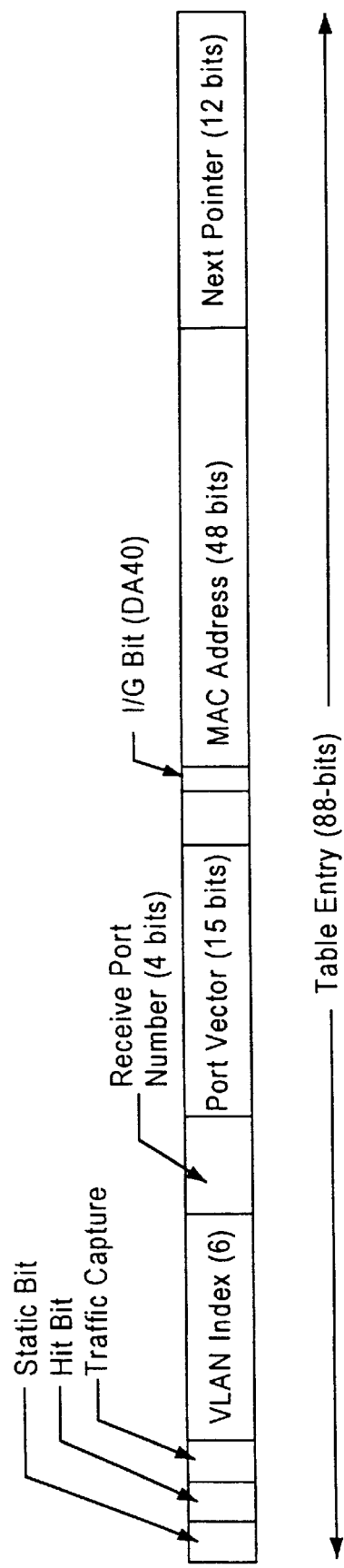
FIG. 6 illustrates the format of an IRC address table entry of the IRC address table of FIG. 5.

FIG. 6 illustrates the composition of each 88-bit table entry shown in FIG. 5. A hit bit is used by the IRC controller 82 for address entry "aging", discussed in more detail below, to delete entries from the address table 84. A static bit, also referred to as an aging override bit, is used to prevent deletion of an address entry within the address table 84.

A traffic capture bit is used to identify traffic capture source and destination MAC addresses for mirroring MAC conversations to the management queue 68. Each entry in the address table also includes a 6-bit VLAN index field used to reference a 12-bit VLAN identifier (ID). A VLAN index-to-VLAN ID table 86, shown in FIG. 4, contains the necessary mapping associations. During normal operation, the multiport switch 12 can receive both tagged and untagged frames. When the multiport switch 12 receives untagged data frames, i.e., without VLAN tag information, the IRC 40 assigns a VLAN index from a VLAN port-to-index table 88, based on the receive port on which the data frame is received. The VLAN index-to-ID table 86 and the VLAN port-to-index table 88 are located with the configuration and status registers 52. However, in alternative configurations, the tables 86 and 88 may be located within the IRC 40.

The receive port number field is a 4-bit field that identifies the port on which the associated MAC address resides. The port vector is a 15-bit field that provides a forwarding descriptor with a vector identifying the ports to which the data flame should be forwarded.

The MAC address field is a 48-bit field that includes both source addresses and destination addresses. The addresses stored in the MAC address field can be unicast, multicast or broadcast. An individual/group (I/G) bit is also included in the MAC address field.

During normal operation of the multiport switch, the host CPU 32 functions as the management entity and is connected to the IRC 40 via the CPU IF 50. Alternatively, a management MAC may be connected to the CPU IF 50 to function as the management entity.

Typically, the host CPU 32 is responsible for initializing the values in the address table 84. Upon power-up, the host CPU 32 loads values into the bin entries 96 of bin portion 92 based on the network configuration, including VLAN configurations. The heap entries 98 of heap portion 94 are not fixed at power-up and are used for adding entries to the address table 84. The IRC 40 uses the specific fields of the address table 84 to make frame forwarding decisions when frames are received by the multiport switch 12. More specifically, the IRC controller 82 includes control logic to search the address table 84 for frame forwarding information. From the information found in the address table 84, the IRC controller 82 creates a forwarding descriptor, which includes a frame pointer, a forwarding port vector, a receive port number, a VLAN ID, a priority class, and a control op code. The IRC controller 82 then transmits the forwarding port vector to the port vector FIFO 56 for queuing, as illustrated in FIG. 3.

To generate the forwarding decision, the IRC controller 82 performs a source address (SA)/VLAN index/Receive (Rx) port number search and a destination address (DA)/ VLAN index search. The switch 12 needs to make frame forwarding decisions relatively quickly, since multiple data frames may be received by the switch 12 simultaneously. Hence, in the exemplary embodiment of the present invention, a hashing scheme is used to search only a subset of the address entries, as described below.

The memory structure of FIG. 5 provides an indexed arrangement, where a given network address will be assigned to a corresponding bin. In other words, each bin entry 96 of the bin portion 92 is configured to reference a plurality of table entries (i.e., heap entries) 98. Hence, the IRC controller 82 performs a search of the address table 84 by first accessing a specific bin entry 96 pointed to by a hash key, and then searching the entries within (i.e., referenced by) the corresponding bin to locate the appropriate match.

Each bin entry 96 is the starting point for the search by the IRC controller 82 for a particular address within the address table 84. A bin entry 96 may reference no addresses (i.e., be empty), may reference only one address within the bin entry location, or may reference a plurality of addresses using a linked list chain structure.

Figure 7:
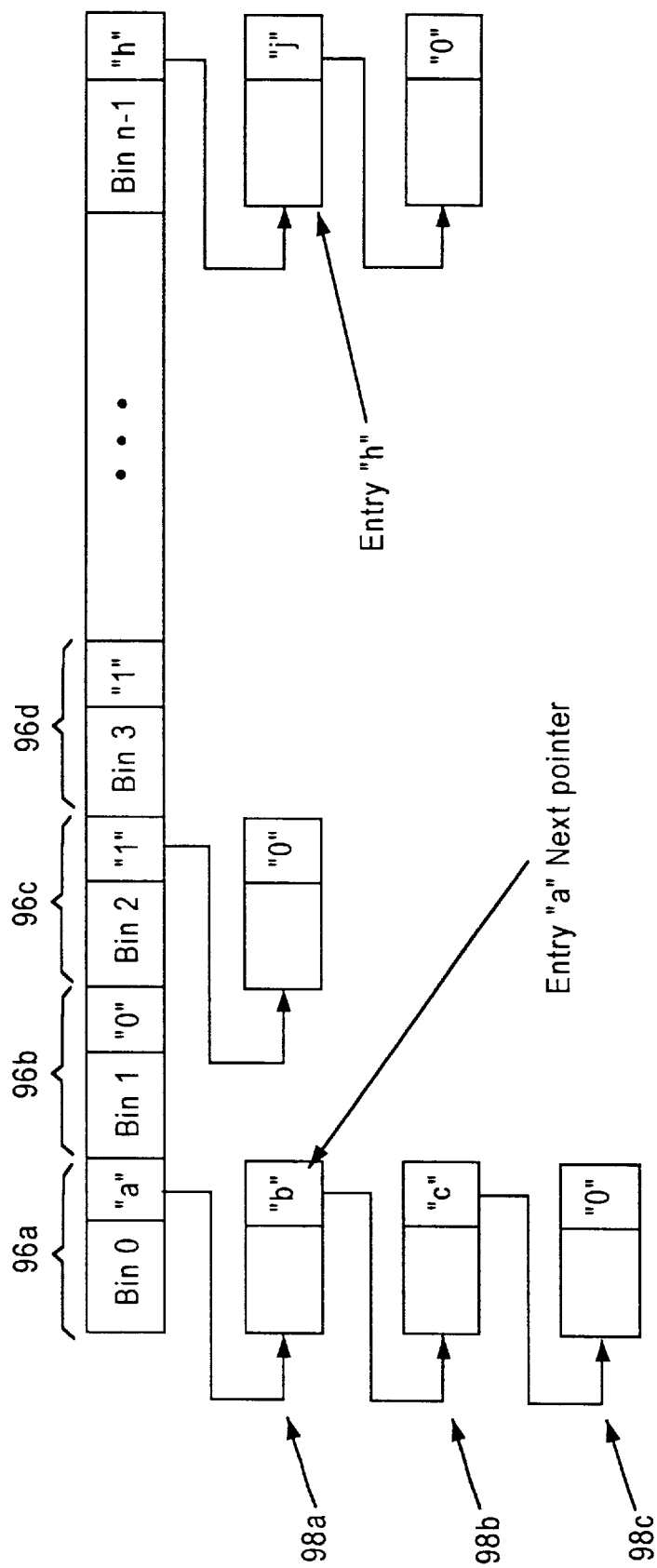
FIG. 7 illustrates linked list chains for identifying table entries relative to a selected bin.

FIG. 7 is a diagram illustrating bin entries 96 referencing a different number of table entries 98. Each of the bin entries 96 and heap entries 98 includes the 76-bit address entry and a 12-bit "next pointer" field. The "next pointer" field associated with the bin entry 96 identifies the location of the next entry in the chain of linked list addresses. For example, Bin 3, 96d, of FIG. 7 does not have any associated table entries 98. In such a case, the 76-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

Figure 8:
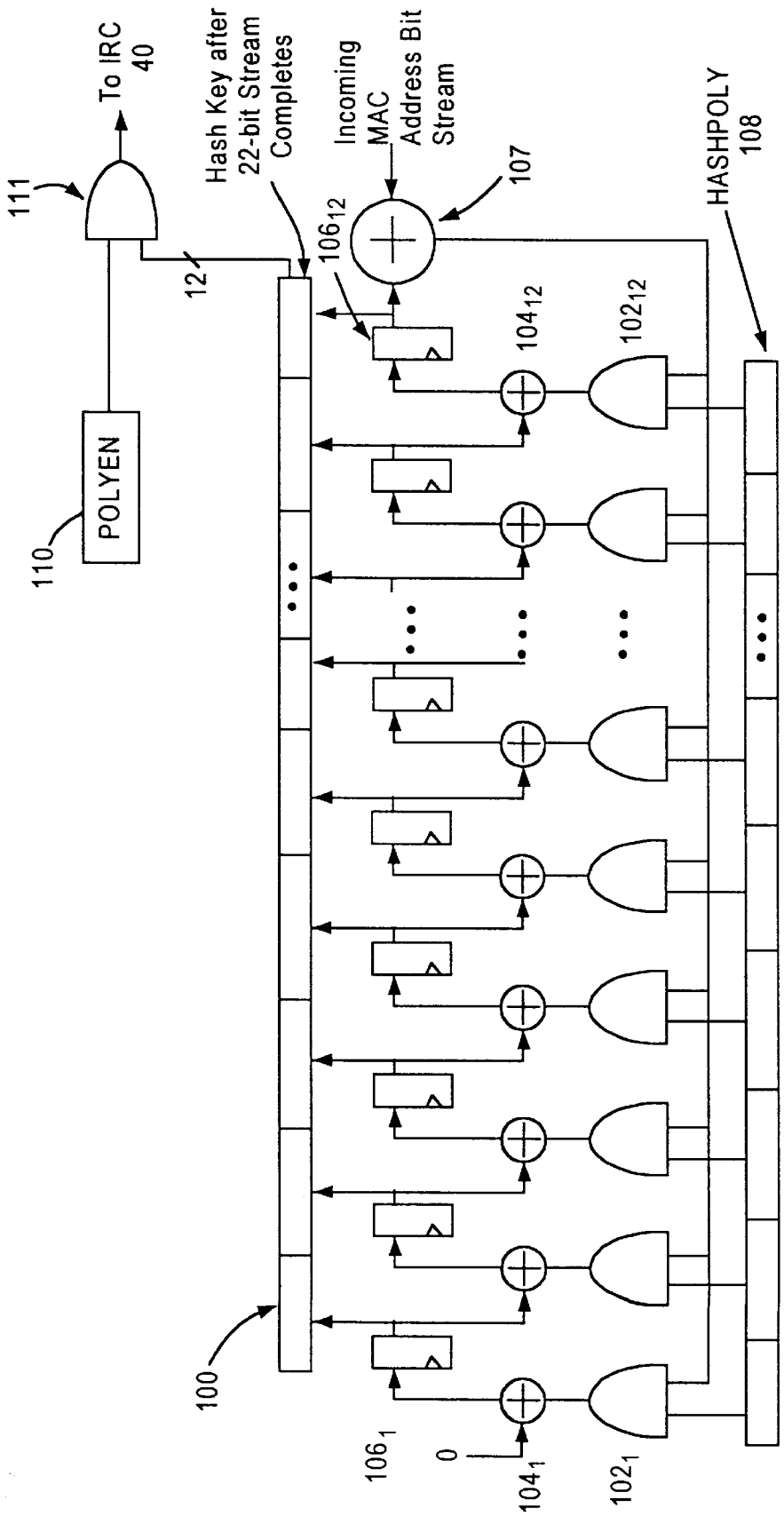
FIG. 8 is a circuit diagram illustrating a hash function calculator used with the internal rules checker of FIG. 2.

FIG. 8 is a circuit diagram illustrating an exemplary hash function calculator 100 used in accordance with an embodiment of the present invention. The hash function calculator 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function calculator 100. Exemplary hash polynomials for the hashing function of the present invention are $X^{12}+x^7+x^4+x^3+1$, which has a HASHPOLY of 0000 1001 1001, and $x^{12}+x^6+x^4+x+1$, which has a HASHPOLY of 0000 0101 0011. The $x^{12}$ term is assumed to always equal "1", and therefore is not stored in the HASHPOLY register 108. Other polynomials may also be used for HASHPOLY based on the particular design requirements.

The hash function calculator 100 generates the hash key using the source address of the data frame according to a user-specified hash function. Initially, the IRC controller 82 concatenates the 16 least significant bits of the source address of the data frame with the VLAN index to create a search key. Next, the hash function calculator 100 XORS, via XOR 107, the search key with the output of the register $106_{12}$. According to one embodiment of the present invention, the search key is initially constructed by the source address lookup logic 90.

The hash function calculator 100 ANDs, via AND gates 102, the output of XOR 107 bitwise with HASHPOLY. The hash function calculator 100 then XORs the output of AND gates 102 with the output of register 106. After the entire search key has been processed, the hash function calculator 100 outputs a 12-bit hash key.

From the 12-bit hash key, the IRC controller 82 calculates a bin number for searching the appropriate bin list in address table 86. More particularly, the IRC 40 uses the lower POLYEN bits of the hash key to generate the bin number. The bin number falls in the range of [0, n−1] where $n=2^{POLYEN}$ and the value of POLYEN is programmed by the host CPU 32 and stored in register 110. The hash key output by the hash function calculator 100 is output to a logic circuit, for example a 12-bit parallel AND gate 111, that selectively outputs the lower significant bits of the hash key based upon a polynomial enable value (POLYEN) stored in register 110. The field "POLYEN" defines how many bits of the hash key are used to create the bin number. For example, if POLYEN=5, then the IRC 40 uses the lower five bits of the hash key. Hence, the hash key output by the logic circuit 100 is based upon masking the 12-bit hash key using the stored register value POLYEN in register 110.

After the bin number is calculated, the IRC controller 82 searches the bin list of the particular bin for an address entry whose address, VLAN index and receive port number fields match the source address (SA), VLAN index and receive (Rx) port of the received frame.

If the IRC controller 82 finds an address entry whose address and VLAN index match the SA and VLAN index of the flame and whose Rx port field matches or corresponds to a port that is in the same "trunk", i.e., a set of ports predefined by the user, as the frame's Rx port, the IRC controller 82 sets the hit bit for that address entry.

The IRC controller 82 then searches the address table 84 for an address entry whose address and VLAN index match the destination address (DA) and VLAN index of the frame. The IRC 40 uses the 12-bit hash function calculator 100, illustrated in FIG. 8, to generate a 12-bit hash key for the DA/VLAN index search. The IRC 40 uses the lower POLYEN bits of the hash key to calculate the bin number in the address table 84. The IRC 40 then searches the appropriate bin list for a DANVLAN index match in the address table 84. If a match is found, the IRC controller 82 uses the port vector field of the address entry to generate the forwarding descriptor.

When the IRC 40 cannot find a DA/VLAN index match, the frame must be "flooded" to all members of the VLAN. Once the necessary forwarding information has been obtained, the IRC controller 82 outputs a forwarding descriptor to the switch sub-system 42, which outputs the received data frame to the appropriate ports based upon the information in the forwarding descriptor.

With reference to FIG. 6, each table entry in the IRC address table 84 includes a static bit field, i.e., an aging override field, and a hit bit field used by the IRC controller 82 in connection with an aging algorithm. As discussed previously, the address table 84 contains a finite number of address entries due to limited space on the switch 12. Therefore, in accordance with the exemplary embodiment, the IRC controller 82 provides a method of "aging" address entries and deleting aged entries after a predetermined amount of time.

The IRC controller 82 automatically performs the aging function based on the contents of an IRC aging configuration register (not shown). The IRC aging configuration register is located with the configuration and status registers 52. However, in alternative configurations, the IRC aging configuration register may be located within the IRC 40.

Referring to FIG. 4, the IRC aging configuration register includes an auto-aging enable field and an aging timer field. When the auto-aging enable field is set, the IRC controller 82 automatically polls each entry in the address table 84 at regular intervals, with the particular interval determined by the aging timer field in register. Upon power-up, the IRC controller 82 sets the timer field to 300 seconds as a default timer value.

The IRC controller 82 "walks" each IRC bin list and examines the hit and static bits. An address entry with a set static bit indicates that the address entry was programmed under Host CPU 32 control and the address entry is not aged by the aging algorithm. However, when both the hit and static bits of an address entry are clear, the IRC 40 deletes the aged address entry.

Time Slot Allocation During Initialization

As previously stated, the IRC 40 is responsible for making forwarding decisions regarding data frames that are received by the multiport switch 12. The scheduler 80 functions to optimize the forwarding process by controlling access to the external memory 36. The scheduler 80 is also responsible for allocating time slots for accessing the address table 84 by various components of the IRC 40. For example, as previously stated, the IRC 40 includes a source address lookup logic 90, destination address lookup logic 91, and aging logic 112. Each of these components usually requires access to the address table 84 in order to perform their designated tasks.

Figure 9:
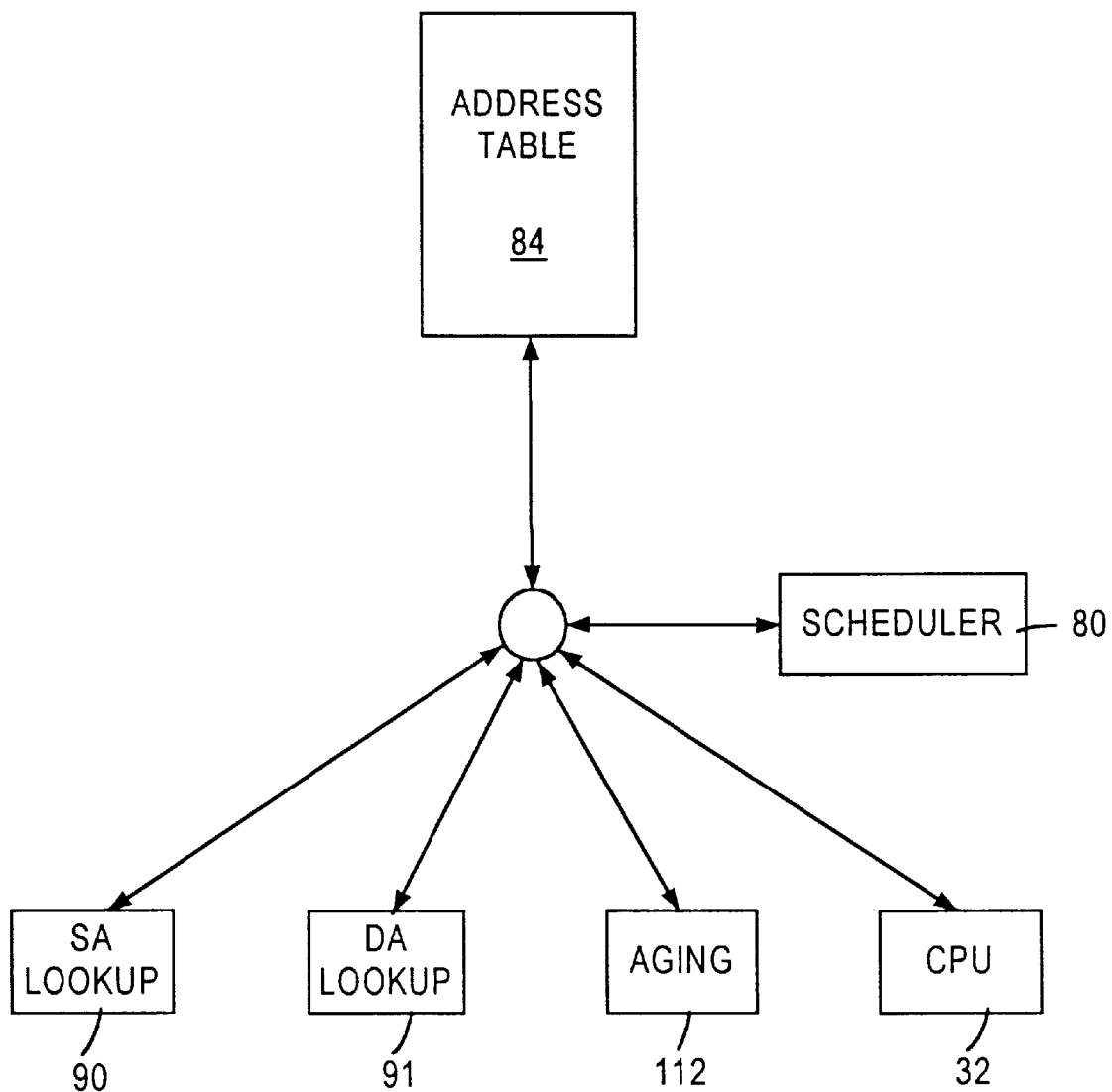
FIG. 9 is a block diagram illustrating an arrangement for accessing the address table according to an embodiment of the present invention.

FIG. 9 is a block diagram illustrating an exemplary arrangement for accessing the address table 84 according to one embodiment of the present invention. According to the illustrated embodiment, the scheduler 80 controls access to the address table 84 by various components such as, for example, the source address lookup logic 90, destination address lookup logic 91, aging logic 112, and CPU. While the disclosed embodiment depicts the scheduler 80 as the entity responsible for controlling access to both the external memory 36 and the address table 84, it should be understood that a second scheduler may also be provided for independently controlling access to the address table 84.

Each component (i.e., source address lookup logic 90, destination address lookup logic 91, aging logic 112, and CPU 32) accesses the address table 84 when the scheduler 80 designates a time slot for the particular component. Furthermore, allocation of a time slot to a component does not guarantee access to the address table 84. According to one embodiment of the present invention, each time slot corresponds to a local clock cycle such as, for example, the CPU clock or local bus clock. Since a given transaction can often require multiple clock cycles to complete, each component must also determine whether the address table 84 is currently being accessed by another component before initiating a transaction.

Figure 10A:
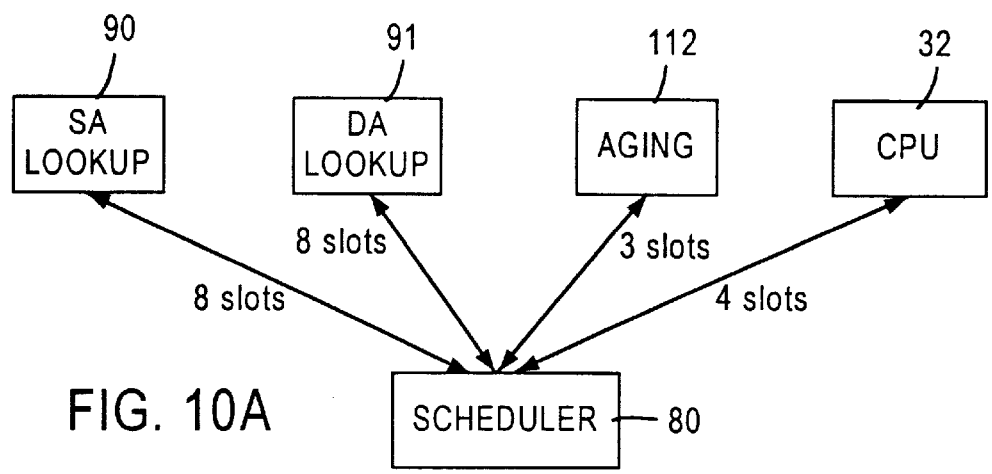
FIG. 10A is a block diagram illustrating exemplary slot allocation times during normal operation of the multiport switch.

FIG. 10A is a block diagram illustrating exemplary slot allocation times during normal operation of the multiport switch 12. According to the illustrated embodiment, the scheduler 80 allocates eight (8) time slots to each the source address lookup logic 90 and destination address lookup logic 91 for accessing the address table 84. The scheduler 80 also allocates three (3) time slots to the aging logic 112, and four (4) time slots to the CPU 32. Accordingly, each component (i.e., source address lookup logic 90, destination address lookup logic 91, aging logic 112, and CPU 32) has a predetermined number of opportunities to access the address table 84 in order to perform its designated tasks. For example, during normal operations, the source address lookup logic 90 uses its assigned time slots to search the address table 84 for network station addresses that match the source address contained in the header of received data frames. Similarly, the aging logic 112 uses its assigned time slots to learn (i.e., add) and age entries in the address table 84.

While the disclosed embodiment of the invention illustrated in FIG. 10A suggests specific values for the number of time slots allocated to each component (totaling 23 time slots), it should be noted that the specific number of time slots assigned to each component, as well as the total number of time slots available, are not restricted in any way. More particularly, these values can vary depending on the specific system requirements. For example, there are no restrictions on the total number of time slots that can be assigned to the individual components of the multiport switch 12. Hence, rather than 23 total time slots, any appropriate value can be used. Similarly, there are no restrictions on the assignment of time slots to individual components. Under normal circumstances, however, the number of time slots allocated to all components should equal the total number of time slots available.

Figure 10B:
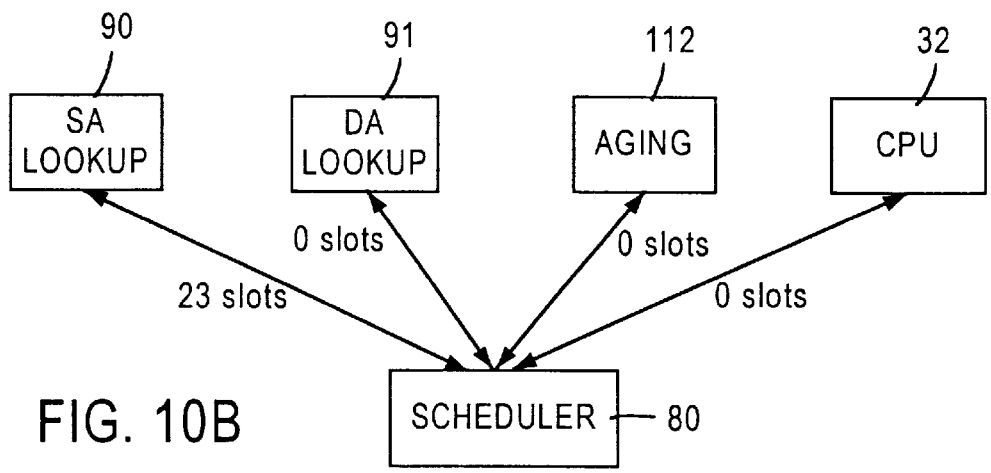
FIG. 10B is a block diagram illustrating reallocation of time slots according to an exemplary embodiment of the present invention.

FIG. 10B is a block diagram illustrating reallocation of time slots according to an exemplary embodiment of the present invention. As previously described, the multiport switch 84 makes forwarding decisions based on information stored in the address table 84. Therefore, when the multiport switch 12 is first activated, no data frames are being received and forwarded because the address table 84 has not been constructed and initialized. Accordingly, time slots are needlessly allocated to various components since the address table 84 is unusable until it is initialized. The component that is responsible for constructing and initializing the address table 84 is forced to perform this task by accessing the address table 84 during its allocated time slots and performing individual transactions. In order to minimize the amount of time required to initialize the address table 84 and commence operation of the multiport switch 12, the scheduler 80 reallocates time slots to the component responsible for constructing and initializing the address table 84. The time slots are reallocated from other components that require little or no access to the address table 84 during initialization. For example, according to one embodiment of the present invention, the scheduler 80 may reallocate up to 100% of the address table bandwidth (i.e., the total number of time slots available for accessing the address table 84) to the component responsible for initializing the address table 84.

FIG. 10B illustrates a situation wherein the source address lookup logic 90 is the component responsible for initializing the address table 84. As previously indicated, the source address lookup logic 90, destination address lookup logic 91, aging logic 112, and CPU 32 are respectfully allocated 8, 8, 3, and 4 time slots to perform their assigned tasks, according to the exemplary embodiment. During initialization, however, only the component (e.g., source address lookup logic 90) responsible for constructing and initializing the address table 84 requires access to the address table 84. According to the embodiment illustrated in FIG. 10B, the scheduler 80 reallocates the time slots from the destination address lookup logic 91, aging logic 112, and CPU 32 to the source address lookup logic 90. Consequently, the source address lookup logic 90 is allocated twenty-three (23) time slots, while the destination address lookup logic 91, aging logic 112, and CPU 32 are temporarily allocated zero (0) time slots. The source address lookup logic 90 is then capable of efficiently constructing and initializing the address table 84. Once the address table 84 is constructed and initialized, the scheduler 80 redistributes the time slots to the values indicated in FIG. 10A.

Figure 10C:
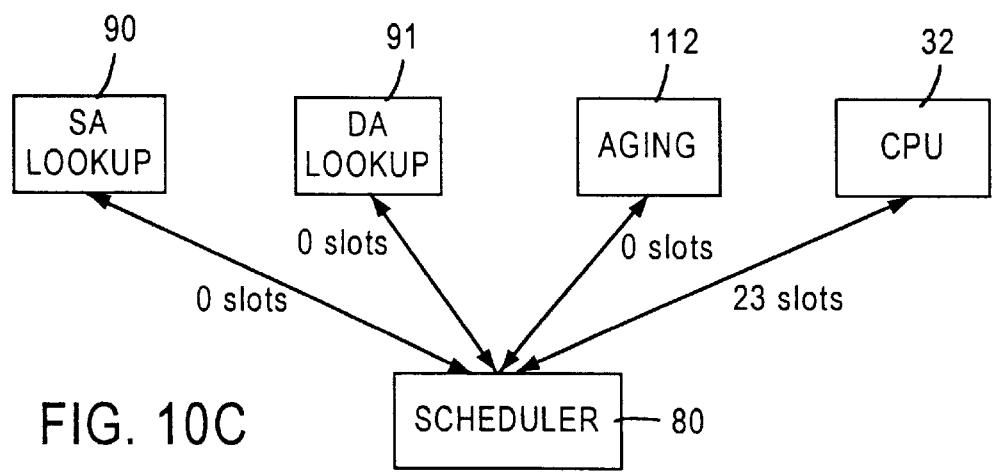
FIG. 10C is a block diagram illustrating reallocation of time slots according to another exemplary embodiment of the present invention.

FIG. 10C is a block diagram illustrating reallocation of time slots according to another exemplary embodiment of the present invention. FIG. 10C illustrates a situation wherein the CPU 32 is responsible for initializing and constructing the address table 84. Hence, during initialization, only the CPU 32 will require access to the address table 84. According to the embodiment illustrated in FIG. 10C, the scheduler 80 reallocates the time slots from the source address lookup logic 90, destination address lookup logic 91, and aging logic 112 to the CPU 32. Consequently, the CPU 32 is allocated twenty-three (23) time slots, while the source address lookup logic 90, destination address lookup logic 91, and aging logic 112 are temporarily allocated zero (0) time slots. The CPU 32 will then proceed to construct and initialize the address table 84. Once the address table 84 is constructed and initialized, the scheduler 80 reallocates the time slots to the values indicated in FIG. 10A.

Figure 11:
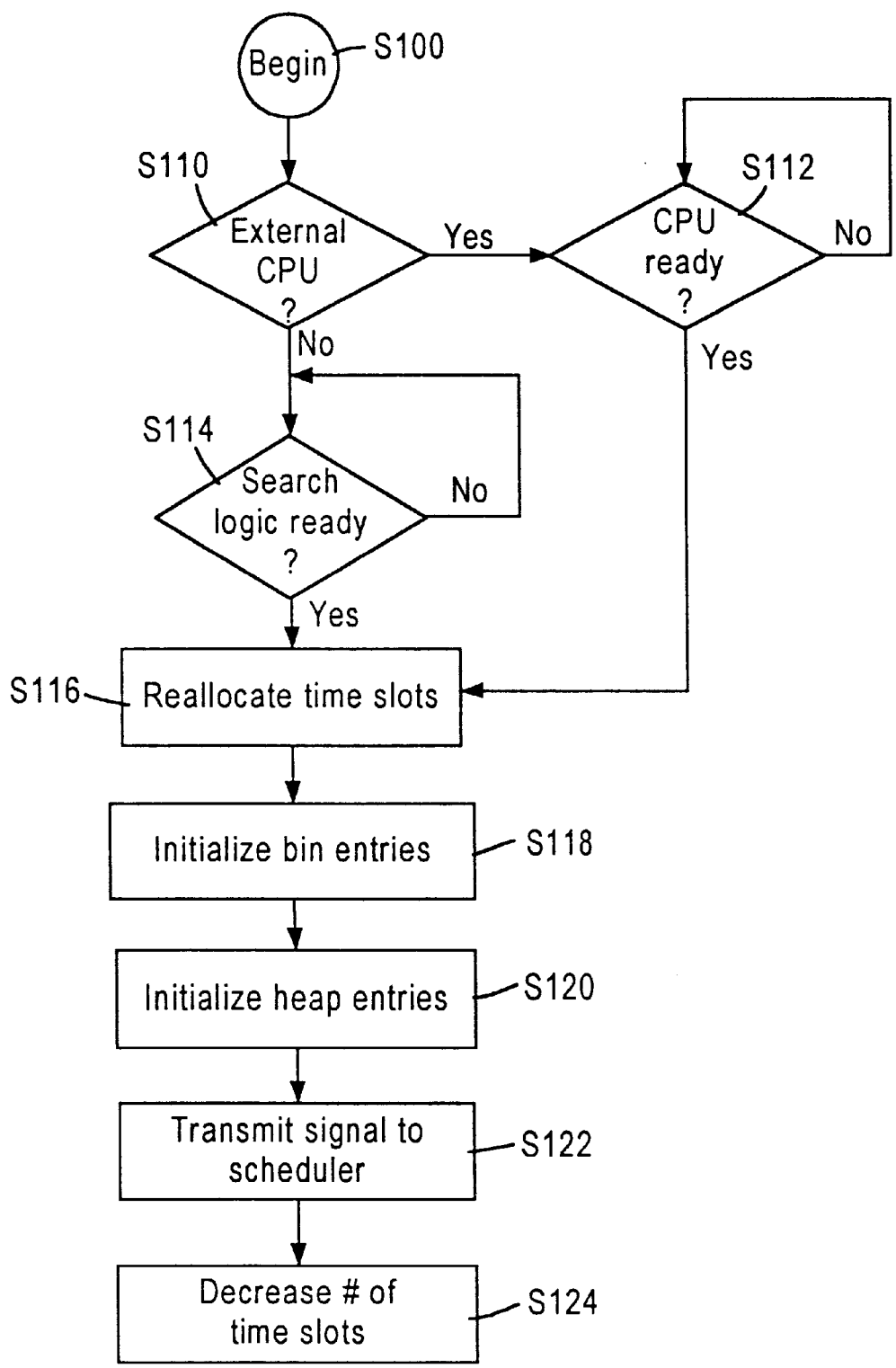
FIG. 11 is a flow chart illustrating the steps performed during construction of the address table.

FIG. 11 is a flow chart illustrating the steps performed by the IRC 40 and scheduler 80 in constructing the address table 84 used in making forwarding decisions for the multiport switch 12. The initialization process begins at step S100. This corresponds, for example, to a particular point in time when the multiport switch 12 is activated. At step S110, the CPU interface 50 attempts to determine if there is an external CPU 32 connected to the multiport switch 12. This may be accomplished by, for example, sampling the signal from an appropriate pin of the CPU interface 50 to determine if an external CPU 32 is attached to the multiport switch 12. Once a determination is made as to the availability of an external CPU 32, control passes to step S112.

At step S112, the IRC 40 determines if the CPU 32 is ready to transact with the multiport switch 12. This can be accomplished, for example, by checking the status of a CPU_READY signal that indicates when the CPU 32 is ready to interact with the multiport switch 12. If the CPU_READY signal indicates that the CPU 32 is ready, control passes to step S116. If the CPU_READY signal indicates that the CPU 32 is not ready, then control returns to step SI 12. This corresponds to repeated testing by the IRC 40 to determine if the CPU 32 is ready. Hence, the IRC 40 will continue sampling the CPU_READY signal until it receives an indication that the CPU 32 is ready. If at step S110 the IRC 40 determines that there is no external CPU 32, then the address table 84 must be constructed by the source address lookup logic 90.

Assuming that there is no external CPU 32, then at step S114 the IRC 40 will determine if the source address lookup logic 90 is ready. If the source address lookup logic 90 is not ready, then control returns to step S114. In other words, the IRC 40 will continue to check the status of the source address lookup logic 90 until the source address lookup logic 90 is ready to begin constructing the address table 84. According to the disclosed embodiment of the invention, when either the source address lookup logic 90 or the CPU 32 is ready to begin constructing the address table 84, control passes to step S116. At this point, the scheduler 80 reassigns all of the time slots allocated to the various components of the IRC 40 to either the source address lookup logic 90 or the CPU 32, depending on which entity will control construction of the address table 84.

At step S118, the bin entries 96 in the bin portion 92 of the address table 84 are initialized. As previously stated, each bin entry 96 includes a next pointer field. In order to initialize the bin portion 92 of the address table 84, a value of 1 is stored into the pointer field for each bin entry 96. The heap portion 94 of the address table 84 is then initialized at step S120. As previously stated, the address table 84 contains 4096 locations, beginning at 0 and terminating at 4095. The bin portion 92 occupies the first n−1 locations of the address table 84, while the remaining locations (n−4095) are used to store heap entries 98. The heap entries 98 are initialized by constructing a chained list of heap entries 98 in the address table 84. This requires chaining together heap entries n−4095 by linking each heap entry's next pointer to address the subsequent heap entry.

For example, the next pointer of heap entry n would be assigned a value of n+1. Similarly, the next pointer of heap entry n+1 would be assigned a value of n+2, . . . , as so on. Finally, the next pointer for the final heap entry is assigned a value of 0 to indicate that it is the last entry in the chain of free heap entries 94. Once construction of the address table 84 is complete, the IRC 40 transmits a ready signal to the scheduler 80 at step S122 to indicate that the address table 84 is ready for operation. At step S122, the scheduler 80 decreases the number of time slots that were allocated to either the source address lookup logic 90 or the CPU 32 for constructing the address table 84. The multiport switch 12 is now ready to make forwarding decisions based on addresses stored in the address table 84.

The present invention greatly minimizes the amount of time necessary to initialize the multiport switch. This is accomplished by reallocating time slots, that were previously assigned to various components of the internal rules checker, to the component that is responsible for constructing the address table. During a typical initialization sequence, the components of the internal rules checker whose time slots are reassigned are typically idle. Hence, by reassigning the time slots, the amount of downtime experienced during the initialization sequence while constructing the address table is minimized without sacrificing overall performance of the system.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of initializing an internal rules checker that makes forwarding decisions for a multiport switch that receives data frames from one source station and forwards the data frames to at least one destination station, the method comprising the steps:

receiving a first signal that requires initialization of the internal rules checker;

increasing, from a nominal value, the number of time slots allocated to an initialization logic of the internal rules checker by a scheduler coupled to the internal rules checker, each time slot corresponding to a prescribed time interval within which data may be transferred to or from the internal rules checker;

constructing, by the initialization logic during the increased number of time slots, an address table that stores addresses of source and destination stations that transmit and receive data frames to and from the multiport switch; and decreasing the number of time slots allocated to the initialization logic back to the nominal value after the address table has been constructed.

2. The method of claim 1, wherein the step of increasing includes the steps:

deallocating time slots assigned to components of the internal rules checker other than the initialization logic;

reassigning all deallocated time slots to the initialization logic.

3. The method of claim 1, further comprising a step of transmitting a second signal from the initialization logic to the scheduler prior to performing the step of decreasing the number of time slots allocated to the initialization logic, the second signal indicating that initialization of the address table has been completed.

4. The method of claim 1, wherein the initialization logic includes an external processor, and the step of receiving a first signal includes the steps:

asserting a third signal, by the multiport switch, that indicates the presence of the external processor; and receiving the first signal indicating that the external processor is ready to begin initializing the internal rules checker.

5. The method of claim 1, wherein the initialization logic includes a source address lookup logic, and the step of receiving a first signal includes the steps:

deasserting a third signal that indicates the presence of an external processor;

receiving the first signal indicating that the source address lookup logic is ready to begin initializing the internal rules checker.

6. The method of claim 1, wherein the address table contains a plurality of locations, and the step of constructing includes the steps:

initializing bin entries stored in a prescribed number of locations within the address table starting from a first location therein; and initializing heap entries stored in remaining locations of the address table.

7. The method of claim 6, wherein the step of initializing heap entries includes the steps:

setting the value of a pointer stored in each current heap entry to address a subsequent heap entry; and setting the value of a pointer stored in the last heap entry to 0 to indicate that no additional heap entries exist in the address table.

8. The method of claim 6, wherein the initialization logic includes an external processor, and the step of constructing includes the steps:

initializing, by the external processor, bin entries stored in a prescribed number of locations within the address table starting from the first location therein; and initializing, by the external processor, heap entries stored in the remaining locations of the address table.

9. The method of claim 6, wherein the initialization logic includes source address lookup logic, and the step of constructing includes the steps:

initializing, by the source address lookup logic, bin entries stored in a prescribed number of locations within the address table starting from the first location therein; and initializing, by the source address lookup logic, heap entries stored in the remaining locations of the address table.

10. Apparatus for initializing an internal rules checker that makes forwarding decisions for a multiport switch that receives data frames from at least one source station and forwards the data frames to at least one destination station, the apparatus comprising:

an address table for storing addresses of source and destination stations that transmit and receive data frames to and from the multiport switch;

initialization logic for constructing and initializing said address table upon startup of the multiport switch; and a scheduler for allocating address table access in the form of time slots to various components of the multiport switch, including said initialization logic, each said time slot corresponding to a prescribed time interval within which data may be transferred to or from the internal rules checker;

said scheduler being configured to increase the number of time slots allocated to said initialization logic upon startup of the multiport switch, and decreasing the number of time slots allocated to said initialization logic once the multiport switch is initialized.

11. The apparatus of claim 10 wherein said scheduler is configured to increase the number of time slots allocated to said initialization logic by deallocating time slots previously allocated to other components of the multiport switch that are idle during startup.

12. The apparatus of claim 10, wherein said address table contains a plurality of locations.

13. The apparatus of claim 10, wherein said initialization logic constructs said address table by initializing bin entries stored in prescribed locations within said address table starting from the first location therein, and initializing heap entries stored in the remaining locations of said address table.

14. The apparatus of claim 13, wherein said initialization logic initializes said heap entries by setting the value of a pointer stored in each current heap entry to address a subsequent heap entry in said address table, and assigning a value of 0 to a pointer stored in the last heap entry in said address table.

15. The apparatus of claim 13, wherein said initialization logic includes an external processor for initializing said address table.

16. The apparatus of claim 13, wherein said initialization logic includes a source address lookup logic for initializing said address table.

* * * * *